(12) United States Patent
Nazarpoor et al.

(10) Patent No.: US 10,533,472 B2
(45) Date of Patent: Jan. 14, 2020

(54) APPLICATION OF SYNERGIZED-PGM WITH ULTRA-LOW PGM LOADINGS AS CLOSE-COUPLED THREE-WAY CATALYSTS FOR INTERNAL COMBUSTION ENGINES

(71) Applicant: Clean Diesel Technologies, Inc., Oxnard, CA (US)

(72) Inventors: Zahra Nazarpoor, Camarillo, CA (US); Stephen J. Golden, Santa Barbara, CA (US); Maxime Launois, Massy (FR)

(73) Assignee: CDTI Advanced Materials, Inc., Oxnard, CA (US)

(*) Notice: Subject to any disclaimer, the term of this patent is extended or adjusted under 35 U.S.C. 154(b) by 82 days.

(21) Appl. No.: 15/586,847

(22) Filed: May 4, 2017

(65) Prior Publication Data
US 2017/0328250 A1 Nov. 16, 2017

Related U.S. Application Data

(60) Provisional application No. 62/335,170, filed on May 12, 2016.

(51) Int. Cl.
*F01N 3/08* (2006.01)
*F01N 3/10* (2006.01)
(Continued)

(52) U.S. Cl.
CPC ........... *F01N 3/101* (2013.01); *B01D 53/945* (2013.01); *B01D 53/9468* (2013.01);
(Continued)

(58) Field of Classification Search
CPC .... B01J 23/005; B01J 2523/828; B01J 23/40; B01J 37/0248; B01D 2255/20761;
(Continued)

(56) References Cited

U.S. PATENT DOCUMENTS 4,629,472 A 12/1986 Haney, III et al.
4,891,050 A 1/1990 Bowers et al.
(Continued)

FOREIGN PATENT DOCUMENTS

DE 102011010104 A1 * 8/2011 ............. B01J 23/30
EP 0 779 095 A1 6/1997
(Continued)

OTHER PUBLICATIONS

Translation of DE102011010104A1 (Year: 2011).*
(Continued)

*Primary Examiner* — Audrey K Bradley
*Assistant Examiner* — Anthony Ayala Delgado
(74) *Attorney, Agent, or Firm* — Thaddius J. Carvis

(57) ABSTRACT

Synergized platinum group metals (SPGM) with ultra-low PGM loadings employed as close-coupled (CC) three-way catalysts (TWC) systems with varied material compositions and configurations are disclosed. SPGM CC catalysts in which ZPGM compositions of binary or ternary spinel structures supported onto support oxides are coupled with commercialized PGM UF catalysts and tested under Federal Test Procedure FTP-75 within TGDI and PI engines. The performance of the TWC systems including SPGM CC (with ultra-low PGM loadings) catalyst and commercialized PGM UF catalyst is compared to the performance of commercialized PGM CC and PGM UF catalysts. The disclosed TWC systems indicate that SPGM CC TWC catalytic performance is comparable or even exceeds high PGM-based conventional TWC catalysts, with reduced tailpipe emissions.

4 Claims, 11 Drawing Sheets

(51) Int. Cl.
*B01D 53/94* (2006.01)
*B01J 23/00* (2006.01)
*B01J 23/42* (2006.01)
*B01J 23/46* (2006.01)
*F01N 13/00* (2010.01)
*B01J 23/755* (2006.01)

(52) U.S. Cl.
CPC ........ *B01D 53/9477* (2013.01); *B01J 23/005* (2013.01); *B01J 23/42* (2013.01); *B01J 23/464* (2013.01); *B01J 23/755* (2013.01); *F01N 3/0864* (2013.01); *F01N 13/0093* (2014.06); *B01D 2255/102* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/2022* (2013.01); *B01D 2255/2027* (2013.01); *B01D 2255/2042* (2013.01); *B01D 2255/2045* (2013.01); *B01D 2255/2047* (2013.01); *B01D 2255/2063* (2013.01); *B01D 2255/2065* (2013.01); *B01D 2255/2066* (2013.01); *B01D 2255/2068* (2013.01); *B01D 2255/2073* (2013.01); *B01D 2255/2092* (2013.01); *B01D 2255/20707* (2013.01); *B01D 2255/20738* (2013.01); *B01D 2255/20746* (2013.01); *B01D 2255/20753* (2013.01); *B01D 2255/20761* (2013.01); *B01D 2255/20784* (2013.01); *B01D 2255/20792* (2013.01); *B01D 2255/405* (2013.01); *B01D 2255/65* (2013.01); *B01D 2255/904* (2013.01); *B01D 2255/9022* (2013.01); *B01D 2255/9025* (2013.01); *B01D 2257/404* (2013.01); *B01D 2257/502* (2013.01); *B01D 2257/702* (2013.01); *B01D 2258/01* (2013.01); *F01N 2370/02* (2013.01); *F01N 2510/06* (2013.01); *Y02T 10/22* (2013.01)

(58) Field of Classification Search
CPC ...... B01D 2255/405; B01D 2255/1025; B01D 2255/207
See application file for complete search history.

(56) References Cited

U.S. PATENT DOCUMENTS

| | | | |
|---|---|---|---|
| 4,892,562 A | 1/1990 | Bowers et al. | |
| 5,034,020 A | 7/1991 | Epperly et al. | |
| 5,168,836 A | 12/1992 | Kraus | |
| 5,203,166 A | 4/1993 | Miller | |
| 5,266,083 A | 11/1993 | Peter-Hoblyn et al. | |
| 5,404,841 A | 4/1995 | Valentine | |
| 5,501,714 A | 3/1996 | Valentine et al. | |
| 5,535,708 A | 7/1996 | Valentine | |
| 5,584,894 A | 12/1996 | Peter-Hoblyn et al. | |
| 5,693,106 A | 12/1997 | Peter-Hoblyn et al. | |
| 5,732,548 A | 3/1998 | Peter-Hoblyn et al. | |
| 5,743,922 A | 4/1998 | Peter-Hoblyn et al. | |
| 5,749,928 A | 5/1998 | Epperly et al. | |
| 5,809,774 A | 9/1998 | Peter-Hoblyn et al. | |
| 5,809,775 A | 9/1998 | Tarabulski et al. | |
| 5,819,529 A | 10/1998 | Peter-Hoblyn et al. | |
| 5,868,421 A | 2/1999 | Eyrainer | |
| 5,921,080 A | 7/1999 | Ulmet et al. | |
| 5,924,280 A | 7/1999 | Tarabulski | |
| 5,939,354 A | 8/1999 | Golden | |
| 5,968,464 A | 10/1999 | Peter-Hoblyn et al. | |
| 5,976,475 A | 11/1999 | Peter-Hoblyn et al. | |
| 5,977,017 A | 11/1999 | Golden | |
| 6,003,303 A | 12/1999 | Peter-Hoblyn et al. | |
| 6,023,928 A | 2/2000 | Peter-Hoblyn et al. | |
| 6,051,040 A | 4/2000 | Peter-Hoblyn et al. | |
| 6,063,350 A | 5/2000 | Tarabulski et al. | |
| 6,124,130 A | 9/2000 | Olson | |
| 6,203,770 B1 | 3/2001 | Peter-Hoblyn et al. | |
| 6,279,603 B1 | 8/2001 | Czarnik et al. | |
| 6,352,955 B1 | 3/2002 | Golden | |
| 6,361,754 B1 | 3/2002 | Peter-Hoblyn et al. | |
| 6,372,686 B1 | 4/2002 | Golden | |
| 6,497,851 B1 * | 12/2002 | Hu | B01D 53/944 422/171 |
| 6,531,425 B2 | 3/2003 | Golden | |
| 6,948,926 B2 | 9/2005 | Valentine et al. | |
| 7,014,825 B2 | 3/2006 | Golden | |
| 7,473,288 B2 | 1/2009 | Toyoda et al. | |
| 7,527,776 B2 | 5/2009 | Golden et al. | |
| 7,641,875 B2 | 1/2010 | Golden | |
| 7,922,988 B2 | 4/2011 | Deeba et al. | |
| 8,323,601 B2 | 12/2012 | Justic et al. | |
| 8,765,085 B2 | 7/2014 | Tran et al. | |
| 8,802,582 B2 | 8/2014 | Malyala et al. | |
| 8,845,987 B1 | 9/2014 | Nazarpoor et al. | |
| 8,853,121 B1 | 10/2014 | Nazarpoor et al. | |
| 9,216,410 B2 | 12/2015 | Hatfield | |
| 2001/0001354 A1 | 5/2001 | Peter-Hoblyn et al. | |
| 2001/0036432 A1 * | 11/2001 | Hu | B01D 53/945 423/213.5 |
| 2002/0001554 A1 | 1/2002 | Czarnik et al. | |
| 2002/0042341 A1 | 4/2002 | Golden | |
| 2003/0109047 A1 | 6/2003 | Valentine | |
| 2003/0126789 A1 | 7/2003 | Valentine et al. | |
| 2003/0148235 A1 | 8/2003 | Valentine et al. | |
| 2003/0185722 A1 | 10/2003 | Toyoda | |
| 2003/0198582 A1 | 10/2003 | Golden | |
| 2004/0098905 A1 | 5/2004 | Valentine et al. | |
| 2004/0172876 A1 | 9/2004 | Sprague et al. | |
| 2005/0132674 A1 | 6/2005 | Toyoda et al. | |
| 2005/0160663 A1 | 7/2005 | Valentine | |
| 2005/0160724 A1 | 7/2005 | Valentine et al. | |
| 2005/0164139 A1 | 7/2005 | Valentine et al. | |
| 2005/0188605 A1 | 9/2005 | Valentine et al. | |
| 2005/0217751 A1 | 10/2005 | Valentine et al. | |
| 2005/0282701 A1 | 12/2005 | Foong et al. | |
| 2006/0081922 A1 | 4/2006 | Golden | |
| 2006/0120936 A1 | 6/2006 | Alive et al. | |
| 2006/0166816 A1 | 7/2006 | Zhang et al. | |
| 2006/0228283 A1 | 10/2006 | Malyala et al. | |
| 2006/0254535 A1 | 11/2006 | Valentine et al. | |
| 2006/0260185 A1 | 11/2006 | Valentine et al. | |
| 2007/0015656 A1 | 1/2007 | Valentine et al. | |
| 2007/0209272 A1 | 9/2007 | Valentine | |
| 2007/0283681 A1 | 12/2007 | Makkee et al. | |
| 2008/0210184 A1 | 9/2008 | Valentine et al. | |
| 2008/0226524 A1 | 9/2008 | Alive et al. | |
| 2009/0004083 A1 | 1/2009 | Valentine et al. | |
| 2009/0304566 A1 | 12/2009 | Golden et al. | |
| 2009/0324468 A1 | 12/2009 | Golden et al. | |
| 2009/0324469 A1 | 12/2009 | Golden et al. | |
| 2010/0240525 A1 | 9/2010 | Golden et al. | |
| 2010/0316545 A1 | 12/2010 | Alive et al. | |
| 2010/0316547 A1 | 12/2010 | Justic et al. | |
| 2011/0239626 A1 | 10/2011 | Makkee et al. | |
| 2012/0183447 A1 | 7/2012 | Kwan et al. | |
| 2013/0115144 A1 | 5/2013 | Golden et al. | |
| 2013/0236380 A1 | 9/2013 | Golden et al. | |
| 2014/0271384 A1 | 9/2014 | Nazarpoor et al. | |
| 2014/0271387 A1 | 9/2014 | Nazarpoor | |
| 2014/0271388 A1 | 9/2014 | Nazarpoor et al. | |
| 2014/0271390 A1 | 9/2014 | Nazarpoor | |
| 2014/0271391 A1 | 9/2014 | Nazarpoor | |
| 2014/0271392 A1 | 9/2014 | Nazarpoor | |
| 2014/0271393 A1 | 9/2014 | Nazarpoor | |
| 2014/0271425 A1 | 9/2014 | Nazarpoor | |
| 2014/0274662 A1 | 9/2014 | Nazarpoor | |
| 2014/0274663 A1 | 9/2014 | Nazarpoor | |
| 2014/0274674 A1 | 9/2014 | Nazarpoor et al. | |
| 2014/0274675 A1 | 9/2014 | Nazarpoor | |
| 2014/0274677 A1 | 9/2014 | Nazarpoor | |
| 2014/0274678 A1 | 9/2014 | Nazarpoor | |
| 2014/0298714 A1 | 10/2014 | Sprague | |

(56) References Cited

U.S. PATENT DOCUMENTS

| | | |
|---|---|---|
| 2014/0301906 A1 | 10/2014 | Hatfield |
| 2014/0301909 A1 | 10/2014 | Nazarpoor |
| 2014/0301926 A1 | 10/2014 | Hatfield |
| 2014/0301931 A1 | 10/2014 | Nazarpoor |
| 2014/0302983 A1 | 10/2014 | Nazarpoor |
| 2014/0334978 A1 | 11/2014 | Hatfield |
| 2014/0334989 A1 | 11/2014 | Nazarpoor et al. |
| 2014/0334990 A1 | 11/2014 | Nazarpoor |
| 2014/0335625 A1 | 11/2014 | Hatfield |
| 2014/0335626 A1 | 11/2014 | Hatfield |
| 2014/0336038 A1 | 11/2014 | Nazarpoor et al. |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1 | 12/2014 | Nazarpoor et al. |
| 2014/0360164 A1 | 12/2014 | Sprague et al. |
| 2014/0364303 A1 | 12/2014 | Hatfield |
| 2015/0004709 A1 | 1/2015 | Nazarpoor |
| 2015/0005157 A1 | 1/2015 | Nazarpoor et al. |
| 2015/0005158 A1 | 1/2015 | Nazarpoor |
| 2015/0005159 A1 | 1/2015 | Nazarpoor et al. |
| 2015/0017082 A1 | 1/2015 | Nazarpoor |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0031268 A1 | 1/2015 | Waites et al. |
| 2015/0050742 A1 | 2/2015 | Nazarpoor |
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor et al. |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |
| 2015/0182951 A1 | 7/2015 | Nazarpoor et al. |
| 2015/0182954 A1 | 7/2015 | Nazarpoor et al. |
| 2015/0196902 A1 | 7/2015 | Golden et al. |
| 2015/0238940 A1 | 8/2015 | Nazarpoor et al. |
| 2015/0238941 A1 | 8/2015 | Nazarpoor et al. |
| 2015/0258496 A1 | 9/2015 | Hatfield et al. |
| 2015/0290627 A1 | 10/2015 | Nazarpoor et al. |
| 2015/0290630 A1 | 10/2015 | Nazarpoor et al. |
| 2015/0316524 A1 | 11/2015 | Hatfield |
| 2015/0352493 A1 | 12/2015 | Zhang et al. |
| 2015/0352494 A1 | 12/2015 | Hatfield et al. |
| 2015/0352529 A1 | 12/2015 | Nazarpoor et al. |
| 2015/0352531 A1 | 12/2015 | Hatfield et al. |
| 2015/0352532 A1 | 12/2015 | Hatfield et al. |
| 2015/0352533 A1 | 12/2015 | Hatfield et al. |
| 2016/0023188 A1 | 1/2016 | Nazarpoor et al. |
| 2016/0030885 A1 | 2/2016 | Hatfield |
| 2016/0047751 A1 | 2/2016 | Pless et al. |
| 2016/0082422 A1 | 3/2016 | Nazarpoor et al. |
| 2016/0121304 A1 | 4/2016 | Nazarpoor et al. |
| 2016/0121308 A1 | 5/2016 | Nazarpoor et al. |
| 2016/0121309 A1 | 5/2016 | Nazarpoor et al. |
| 2016/0136617 A1 | 5/2016 | Nazarpoor et al. |
| 2016/0136618 A1 | 5/2016 | Nazarpoor et al. |
| 2016/0136619 A1 | 5/2016 | Nazarpoor et al. |
| 2016/0136620 A1 | 5/2016 | Nazarpoor et al. |
| 2016/0136621 A1 | 5/2016 | Nazarpoor et al. |
| 2016/0167023 A1 | 6/2016 | Nazarpoor et al. |
| 2016/0167024 A1 | 6/2016 | Nazarpoor et al. |
| 2016/0263526 A1 | 9/2016 | Golden |
| 2016/0263561 A1 | 9/2016 | Nazarpoor et al. |
| 2016/0312730 A1 | 10/2016 | Launois et al. |
| 2016/0346765 A1 | 12/2016 | Nazarpoor et al. |
| 2016/0354765 A1 | 12/2016 | Hatfield et al. |
| 2016/0361710 A1 | 12/2016 | Nazarpoor et al. |
| 2016/0361711 A1 | 12/2016 | Nazarpoor et al. |
| 2017/0095794 A1 | 4/2017 | Nazarpoor et al. |
| 2017/0095800 A1 | 4/2017 | Nazarpoor et al. |

FOREIGN PATENT DOCUMENTS

| | | |
|---|---|---|
| WO | WO 90/07561 | 7/1990 |
| WO | WO 94/11467 | 5/1994 |
| WO | WO 95/02655 | 1/1995 |
| WO | WO 97/04045 | 2/1997 |
| WO | WO 97/09523 | 3/1997 |
| WO | WO 97/28358 | 8/1997 |
| WO | WO 97/36676 | 10/1997 |
| WO | WO 98/22209 A1 | 5/1998 |
| WO | WO 98/28070 A1 | 7/1998 |
| WO | WO 00/30739 A1 | 6/2000 |
| WO | WO 00/75643 A1 | 12/2000 |
| WO | WO 01/85876 A1 | 11/2001 |
| WO | WO 03/068363 A1 | 8/2003 |
| WO | WO 2004/058641 A1 | 7/2004 |
| WO | WO 2007/077462 | 7/2007 |
| WO | WO 2009/139860 A1 | 11/2009 |
| WO | WO 2011/068509 A1 | 6/2011 |
| WO | WO 2011/092517 A1 | 8/2011 |
| WO | WO 2014/194101 A1 | 12/2014 |
| WO | WO 2015/081156 A1 | 6/2015 |
| WO | WO 2015/081183 A1 | 6/2015 |
| WO | WO 2015/199687 A1 | 12/2015 |
| WO | WO 2015/199688 A1 | 12/2015 |
| WO | WO 2016/039747 A1 | 3/2016 |
| WO | WO 2016/203371 | 12/2016 |

OTHER PUBLICATIONS

Robart et al., *Innovative Materials with High Stability, High OSC, and Low Light-Off for Low PGM Technology*, SAE International, Mar. 8, 2004, 11 pages.

Yashnik et al., *Development of monolithic catalysts with low noble metal content for diesel vehicle emission control*, Topics in Catalysis vol. 1-4, Jul. 2004, 293-298.

International Search Report and Written Opinion from International Application No. PCT/IB2017/052737 dated Aug. 4, 2017, 15 pages.

\* cited by examiner

300

APPLICATION OF SYNERGIZED-PGM WITH ULTRA-LOW PGM LOADINGS AS CLOSE-COUPLED THREE-WAY CATALYSTS FOR INTERNAL COMBUSTION ENGINES

CROSS REFERENCE TO RELATED APPLICATIONS

The present application claims priority to U.S. Provisional Application No. 62/335,170, filed May 12, 2016, the contents of which is hereby incorporated by reference in its entirety.

BACKGROUND

Field of the Disclosure

The present disclosure relates generally to three-way catalyst (TWC) systems, and more particularly, to synergized-PGM TWC catalysts with ultra-low PGM loadings employed in close-coupled configurations for reduction of emissions from engine exhaust systems.

Background Information

Three-way catalyst (TWC) systems continue to be implemented as the primary emission control strategy for internal combustion engines within vehicles. However, a period of rapidly evolving production road maps for engine/combustion improvements that are tied to energy efficiency has recently begun by the automotive industry. Associated catalytic improvements will need to go beyond the fine tuning of platinum group metals (PGM) usage and rare earth (RE) metals used as oxygen storage materials (OSM) and will present important challenges to catalyst developers.

The trend toward more stringent tailpipe regulations, noted from the global tightening of the light and heavy duty emission standards, have led to important improvements in the development of modern catalysts including: improved fuel economy and reduction of greenhouse gas emissions requirements that establish lower exhaust temperatures; and material supply issues related to the supply and demand of PGM materials as a result of their availability and price volatility. As changes in the formulation of catalysts continue to increase the cost of TWC systems, the need for catalysts of significant catalytic performance has directed efforts toward the development of catalytic materials capable of providing the required synergies to achieve greater catalytic performance. Additionally, compliance with ever stricter environmental regulations, and the need for lower manufacturing costs require new types of TWC systems. Therefore, there is a continuing need to provide TWC systems, employing reduced amounts of PGM catalyst materials and that are free of RE metals, which exhibit catalytic properties substantially similar to or exceeding the catalytic properties exhibited by conventional TWC systems employing standard amounts of PGM catalyst materials and RE metals.

SUMMARY

The present disclosure describes three-way catalyst (TWC) systems including synergized ultra-low platinum group metals (PGM) loadings close-coupled (CC) catalysts. The ultra-low PGM loadings CC catalysts within the TWC systems are synergized with Zero-PGM (ZPGM) catalyst material compositions comprising spinel oxide materials. The catalyst material compositions within the ZPGM layers of the SPGM CC catalysts include binary or ternary spinel structures supported onto support oxides. The catalyst material compositions within the PGM layers include variable platinum (Pt)/palladium (Pd)/rhodium (Rh) with ultra-low concentrations within a range of about 1 $g/ft^3$ to about 10 $g/ft^3$ supported onto support oxides.

In some embodiments, a variety of TWC systems are configured to assess their catalytic performance measuring tailpipe emissions according to the U.S. Federal Test Procedure (FTP-75) protocol. In these embodiments, the TWC systems are configured to include commercially available underfloor (UF) catalysts and SPGM (with ultra-low PGM) CC catalysts. Further to these embodiments, the configured TWC systems, including the SPGM CC catalysts, are mechanically coupled to and in fluidic communication with an internal combustion engine, such as, for example a Tier 2 bin 4 turbo gasoline direct injection (TGDI) engine or a naturally aspirated port-injection (PI) engine, amongst others, for emission certification testing according to FTP-75 protocol.

In other embodiments, a standard TWC system is configured with commercially available PGM-based OEM CC, and PGM-based OEM and aftermarket UF catalysts. In these embodiments, the standard TWC system is mechanically coupled to and in fluidic communication with substantially similar engines used for testing the aforementioned TWC systems including ultra-low loading SPGM CC catalysts according to FTP-75 protocol.

In further embodiments, prior to emission testing according to FTP-75 protocol, the OEM CC, OEM UF, and SPGM CC catalysts within the TWC systems are aged on an engine bench employing a standard multi-mode aging cycle at bed temperatures of about 1000° C. and about 900° C. for about 50 hours, respectively, for CC and UF catalysts.

In some embodiments, catalytic efficiency of SPGM CC catalyst, measured downstream at the tailpipe (weighted bag results) for the aforementioned TWC systems is assessed according to FTP-75 protocol and further compared with the weighted emissions measured for the CC high PGM OEM catalysts.

In one embodiment, the disclosure is directed to a catalytic system for treating an exhaust stream of a combustion engine, comprising a combustion engine; a close-coupled catalytic converter configured to accept at least one exhaust gas stream from said combustion engine, wherein the close-coupled catalytic converter comprising a synergized platinum group metal catalyst comprising a spinel catalyst composition and an ultra-low platinum group metal catalyst material, and wherein the platinum group metal catalyst material has a platinum group metal concentration of about 1 $g/ft^3$ to about 10 $g/ft^3$; and an underfloor catalytic converter downstream of, and, in fluid communication with said close-coupled catalytic converter, wherein the underfloor catalytic converter comprising a platinum group metal catalyst.

In one embodiment, the underfloor catalytic converter has a platinum group metal concentration of about 10 to 100 $g/ft^3$, and more typically from about 15 to 60 $g/ft^3$.

In some embodiments, the platinum group metal of the underfloor catalytic converter is selected from the group consisting of platinum, palladium, ruthenium, iridium, and rhodium. In a preferred embodiment, the platinum group metal of the underfloor catalytic converter comprises a combination of platinum and rhodium.

The spinel catalyst composition of the synergized platinum group metal catalyst may comprise a binary spinel having the general formula $A_xB_{3-x}O_4$ wherein X is from 0.01 to 2.99, and A and B are selected from the group consisting of sodium, potassium, calcium, barium, zinc, cadmium, aluminum, magnesium, manganese, nickel, copper, cobalt, iron, chromium, titanium, cerium, strontium, lanthanum, praseodymium, neodymium, samarium, indium, and mixtures thereof.

For example, the binary spinel may comprises a Ni—Fe spinel, for example, a Ni—Fe spinel structure comprising $Ni_{0.5}Fe_{2.5}O_4$.

In some embodiments, the spinel catalyst composition comprises at least one substrate, and a catalyst composition comprising a spinel oxide having the formula $A_XB_YM_{3-X-Y}$ where X is from about 0.01 to about 1.99 and Y is from about 0.01 to about 1.0, and wherein A, B, and M are different from each other, and are selected from the group consisting of sodium, potassium, calcium, barium, zinc, cadmium, aluminum, magnesium, manganese, nickel, copper, cobalt, iron, chromium, titanium, cerium, strontium, lanthanum, praseodymium, neodymium, samarium, indium, and mixtures thereof.

In one embodiment, the spinel catalyst composition is supported onto a support oxide selected from the group consisting of $Al_2O_3$, doped $Al_2O_3$, $ZrO_2$, doped $ZrO_2$, $SiO_2$, doped $SiO_2$, $TiO_2$, doped $TiO_2$, doped $Al_2O_3$—$ZrO_2$, $Nb_2O_5$, and mixtures thereof.

In one embodiment, the spinel catalyst composition is deposited onto a substrate as a washcoat layer, and the ultra-low platinum group metal catalyst material is deposited onto said washcoat layer as an overcoat layer. An example of a suitable substrates on which the spinel catalyst composition is deposited is a ceramic, such as cordierite.

In one embodiment, the platinum group metal of the ultra-low platinum group metal catalyst is selected from the group consisting of platinum, palladium, ruthenium, iridium, and rhodium. In a preferred embodiment, the platinum group metal of the ultra-low platinum group metal catalyst comprises a combination of platinum and rhodium. In one particular embodiment, the amount of platinum in the ultra-low platinum group metal catalyst material is from about 1 to 10 $g/ft^3$, and the amount of rhodium in the ultra-low platinum group metal catalyst material is from about 1 to 10 $g/ft^3$.

In one embodiment, the ultra-low platinum group metal catalyst material comprises a combination of platinum and rhodium. Generally, the platinum and rhodium may be present in any ratio, such as between 1:10 and 10:1. In a preferred embodiment, the ultra-low platinum group metal catalyst material comprises a combination of platinum and rhodium that are present in a 1:1 ratio.

In one embodiment, the spinel catalyst composition comprises a Ni—Fe binary spinel structure supported onto a doped $Al_2O_3$—$ZrO_2$ support oxide.

In some embodiments, the underfloor catalytic converter comprises a combination of platinum and rhodium, wherein the total amount of platinum group metals in said underfloor catalytic converter is from about 15 to 25 $g/ft^3$.

In some embodiments, the platinum group metal catalyst of the synergized platinum group metal catalyst is free of rare earth metals and oxygen storage materials.

Advantageously, embodiments of the catalytic system exhibit reductions in tailpipe emissions of NOx, CO, and THC in comparison to a similar system having a platinum group metal catalyst as the close-coupled catalytic converter in lieu of a synergized platinum group metal catalyst.

In a further embodiment, the disclosure provides a method for removing pollutants from an exhaust stream of a combustion engine. For example, the method may include the steps of introducing an exhaust stream of the combustion engine into a close-coupled catalytic converter comprising a synergized platinum group metal catalyst comprising a spinel catalyst composition and an ultra-low platinum group metal catalyst material, wherein the platinum group metal catalyst has a concentration of about 1 $g/ft^3$ to about 10 $g/ft^3$ to thereby at least partially catalytically convert NOx, CO, and THC; and introducing the at least partially catalytically converted exhaust stream into an underfloor catalytic converter comprising a platinum group metal catalyst.

In a preferred embodiment, the spinel catalyst composition comprises a Ni—Fe binary spinel structure supported onto a doped $Al_2O_3$—$ZrO_2$ support oxide.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
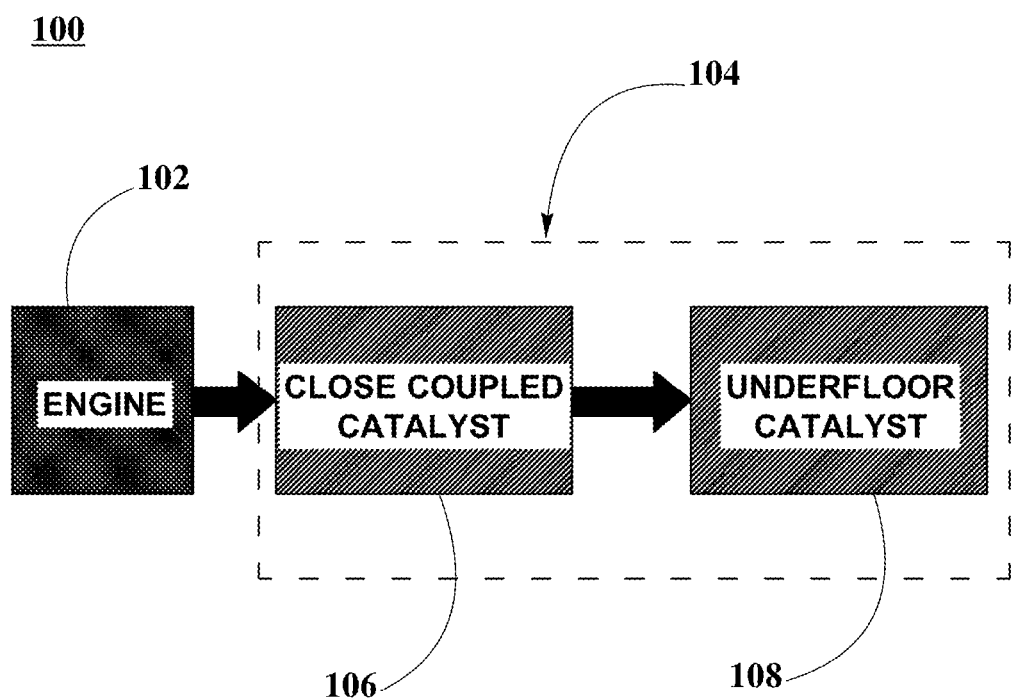
FIG. 1 is a graphical representation illustrating a configuration for three-way catalyst (TWC) systems including close-coupled (CC) and underfloor (UF) catalysts, according to an embodiment.

The present disclosure is described herein in detail with reference to embodiments illustrated in the drawings, which form a part hereof. Other embodiments may be used and/or other modifications may be made without departing from the scope or spirit of the present disclosure. The illustrative embodiments described in the detailed description are not meant to be limiting of the subject matter presented.

Definitions

As used here, the following terms have the following definitions:

"Air-to-fuel ratio (AFR)" refers to the mass ratio of air to fuel present in a combustion process such as in an internal combustion engine.

"Calcination" refers to a thermal treatment process applied to solid materials, in presence of air, to bring about a thermal decomposition, phase transition, or removal of a volatile fraction at temperatures below the melting point of the solid materials.

"Catalyst" refers to one or more materials that may be of use in the conversion of one or more other materials.

"Catalytic converter" refers to a vehicle emissions control device that converts toxic pollutants in exhaust gas to less toxic pollutants by catalyzing a redox reaction (oxidation, reduction, or both).

"Catalyst system" refers to any system including a catalyst, such as a PGM catalyst or a ZPGM catalyst of at least two layers comprising a substrate, a washcoat and/or an overcoat.

"Close-coupled catalyst (CCC)" refers to a catalyst located in close proximity to the engine's exhaust manifold.

"Conversion" refers to the chemical alteration of at least one material into one or more other materials.

"U.S. Federal Test Procedure (FTP) emission test" refers to emission certification testing procedure of light-duty vehicles in the United States.

"Impregnation" refers to the process of imbuing or saturating a solid layer with a liquid compound or the diffusion of some element through a medium or substance.

"Incipient wetness (IW)" refers to the process of adding solution of catalytic material to a dry support oxide powder until all pore volume of support oxide is filled out with solution and mixture goes slightly near saturation point.

"Lambda" refers to a ratio of actual air-to-fuel ratio to a stoichiometric air-to-fuel ratio.

"Milling" refers to the operation of breaking a solid material into a desired grain or particle size.

"Original Equipment Manufacturer (OEM)" refers to a manufacturer of a new vehicle or a manufacturer of any part or component that is originally installed in a new vehicle's certified emission control system.

"Overcoat (OC) layer" refers to a catalyst layer of at least one coating that can be deposited onto at least one washcoat layer or impregnation layer.

"Platinum group metals (PGM)" refers to platinum, palladium, ruthenium, iridium, osmium, and rhodium.

"Spinel" refers to any minerals of the general formulation $AB_2O_4$ where the A ion and B ion are each selected from mineral oxides, such as, for example magnesium, iron, zinc, manganese, aluminum, chromium, titanium, nickel, cobalt, or copper, amongst others.

"Substrate" refers to any material of any shape or configuration that yields a sufficient surface area for depositing a washcoat layer and/or an overcoat layer.

"Support oxide" refers to porous solid oxides, typically mixed metal oxides, which are used to provide a high surface area that aids in oxygen distribution and exposure of catalysts to reactants, such as, for example $NO_X$, CO, and hydrocarbons.

"Synergized-PGM (SPGM) catalyst" refers to a PGM catalyst system that is synergized by a ZPGM compound employing different catalyst configurations.

"Three-way catalyst (TWC)" refers to a catalyst that performs the three simultaneous tasks of reduction of nitrogen oxides to nitrogen and oxygen, oxidation of carbon monoxide to carbon dioxide, and oxidation of unburnt hydrocarbons to carbon dioxide and water.

"Underfloor (UF) catalyst" refers to a catalyst that is incorporated into the exhaust system of a motor vehicle, typically located beneath the floor of vehicle, mechanically coupled downstream to a close-coupled (CC) catalyst.

"Washcoat (WC) layer" refers to a catalyst layer of at least one coating, including at least one oxide solid that can be deposited onto a substrate.

"Zero-PGM (ZPGM) catalyst" refers to a catalyst completely or substantially free of platinum group metals (PGM).

Description of the Disclosure

The present disclosure describes synergized platinum group metals (SPGM) close-coupled (CC) three-way catalysts that are produced having a catalyst configuration that includes an ultra-low PGM composition synergized with a spinel-based ZPGM composition, which is free of rare-earth (RE) metals compositions. These SPGM CC catalysts are incorporated within engine systems as components of TWC converters that are part of TWC systems for controlling and reducing engine exhaust emissions. The conversion performance of these TWC systems is assessed and compared using the driving phases described in the U.S. Federal Test Procedure (FTP-75) protocol (2014).

TWC System Configuration

FIG. 1 is a graphical representation illustrating a configuration for three-way catalyst (TWC) systems including close-coupled (CC) and underfloor (UF) catalysts, according to an embodiment. In FIG. 1, engine system 100 includes engine 102 and TWC system 104. TWC system 104 further includes close-coupled (CC) catalyst 106 and underfloor (UF) catalyst 108. In FIG. 1, engine 102 is mechanically coupled to and in fluidic communication with TWC system 104. In TWC system 104, CC catalyst 106 is mechanically coupled to and in fluidic communication with UF catalyst 108.

In some embodiments, CC catalyst 106 is implemented as either a PGM commercialized catalyst including a high PGM loading or as a SPGM catalyst including ultra-low PGM loadings. In these embodiments, UF catalyst 108 is implemented as a PGM commercialized catalyst including a high PGM loading. Further to these embodiments, engine 102 can be implemented as an internal combustion engine employed within a motor vehicle, such as, for example a Tier 2 bin 4 turbo gasoline direct injection (TGDI) engine or a naturally aspirated port-injection (PI) engine, amongst others. In these embodiments, a variety of TWC systems can be configured to assess and compare the catalytic performance when employed with engine 102.

TWC System 1

In some embodiments, TWC system 104, herein referred to as TWC system 1, is implemented including a high PGM-based original equipment manufacturer (OEM) CC and OEM UF catalysts. In these embodiments, CC catalyst 106 is a high PGM-based OEM CC catalyst with a PGM loading of about 98 g/ft$^3$ palladium (Pd) and about 8 g/ft$^3$ rhodium (Rh), resulting in a total PGM loading of about 106 g/ft$^3$ and a substrate having a volume of about 1.7 L. Further to these embodiments, UF catalyst 108 is a high PGM-based OEM UF catalyst with a PGM loading of about 51 g/ft$^3$ Pd and about 8 g/ft$^3$ Rh, resulting in a total PGM loading of about 59 g/ft$^3$ and a substrate having a volume of about 1.3 L.

TWC System 2

In some embodiments, TWC system 104, herein referred to as TWC system 2, is implemented including a high PGM-based OEM UF catalyst as described previously above in TWC system 1 and a SPGM CC catalyst with ultra-low PGM loadings. In these embodiments, CC catalyst 106 is a SPGM CC catalyst that includes a spinel-based ZPGM layer, coated with an ultra-low PGM layer of about 5 g/ft$^3$ platinum (Pt) and about 5 g/ft$^3$ Rh, resulting in a total PGM loading of about 10 g/ft$^3$.

TWC System 3

In some embodiments, TWC system 104, herein referred to as TWC system 3, is implemented including a commercially available high PGM-based CC and UF catalysts. In these embodiments, CC catalyst 106 is a high PGM-based CC catalyst with a PGM loading of about 55.9 g/ft$^3$ Pd and about 4.3 g/ft$^3$ Rh, resulting in a total PGM loading of about 60.2 g/ft$^3$ and a substrate having a volume of about 1.083 L. Further to these embodiments, UF catalyst 108 is a high PGM-based OF catalyst with a PGM loading of about 18 g/ft$^3$ Pt and about 4 g/ft$^3$ Rh, resulting in a total PGM loading of about 22 g/ft$^3$ and a substrate having a volume of about 1.083 L.

TWC System 4

In some embodiments, TWC system 104, herein referred to as TWC system 4, is implemented including a PGM-based UF catalyst and a SPGM CC catalyst with ultra-low PGM loadings as described previously above in TWC system 2. In these embodiments, UF catalyst 108 is a PGM-based OF catalyst with a PGM loading of about 12 g/ft$^3$ Pd and about 6 g/ft$^3$ Rh, resulting in a total PGM loading of about 18 g/ft$^3$ and a substrate of about 1.083 L. Further to these embodiments, CC catalyst 106 is a SPGM CC catalyst that includes spinel-based ZPGM layer, coated with an ultra-low PGM layer of about 5 g/ft$^3$ Pt and about 5 g/ft$^3$ Rh, resulting in a total PGM loading of about 10 g/ft$^3$.

In some embodiments, TWC system 1 and TWC system 2, are mechanically couple to and in fluidic communication with a TGDI engine used for testing the aforementioned TWC systems. In other embodiments, TWC system 3 and TWC system 4 are mechanically coupled to and in fluidic communication with a PI engine used for testing the aforementioned TWC systems.

SPGM CC Catalyst Configuration

In some embodiments, SPGM CC catalyst includes a substrate, a washcoat (WC) layer coated onto the substrate, and an overcoat (OC) layer coated onto the WC layer. In these embodiments, a PGM composition is implemented as an OC layer. Further to these embodiments, a ZPGM composition is implemented as a WC layer. Still further to these embodiments, different combinations of ZPGM and PGM composition provide different interactions between the ZPGM WC layer and the PGM OC layer within the SPGM CC catalyst configuration.

Material Composition of ZPGM Layer Employed within SPGM CC Catalysts

In some embodiments, a ZPGM composition employed within the WC layer includes binary spinel structures with a general formulation $A_XB_{3-X}O_4$ in which X is a variable for molar ratios within a range from about 0.01 to about 2.99. In these embodiments, A and B can be implemented as Na, K, Mg, Ca, Sr, Ba, Cr, Mn, Fe, Co, Ni, Cu, Zn, Cd, Al, Ti, Ce, La, Pr, Nd, Sm, In, or mixtures thereof, amongst others. Further to these embodiments, the binary spinel structures are supported onto support oxides. Examples of support oxides include alumina ($Al_2O_3$), doped $Al_2O_3$, zirconia ($ZrO_2$), doped $ZrO_2$, doped $Al_2O_3$—$ZrO_2$, $TiO_2$, $Nb_2O_5$, $SiO_2$, or mixtures thereof, amongst others.

In an example, the ZPGM composition employed within the WC layer is implemented as a binary spinel structure of nickel (Ni) and iron (Fe). In this example, the Ni—Fe spinel structure is produced using a general formulation $Ni_XFe_{3-X}O_4$ spinel in which X takes a value of about 0.5 for a $Ni_{0.5}Fe_{2.5}O_4$ binary spinel structure. Further to this example, the $Ni_{0.5}Fe_{2.5}O_4$ binary spinel structure is supported onto a doped $Al_2O_3$—$ZrO_2$ support oxide powder.

In other embodiments, a ZPGM composition employed within the WC layer includes ternary spinel structures with a general formulation $A_XB_YM_{3-X-Y}O_4$ in which X is a variable for different molar ratios within a range from about 0.01 to about 1.99, and Y is a variable for different molar ratios within a range from about 0.01 to about 1.0. In these embodiments, A, B, and M can be implemented as Na, K, Mg, Ca, Sr, Ba, Cr, Mn, Fe, Co, Ni, Cu, Zn, Cd, Al, Ti, Ce, La, In, or mixtures thereof, amongst others. Further to these embodiments, the ternary spinel structures are supported onto support oxides. Examples of support oxides include alumina ($Al_2O_3$), doped $Al_2O_3$, zirconia ($ZrO_2$), doped $ZrO_2$, doped $Al_2O_3$—$ZrO_2$, $TiO_2$, $Nb_2O_5$, $SiO_2$, or mixtures thereof, amongst others.

Material Composition of PGM Layer Employed within SPGM CC Catalysts

In some embodiments, a PGM composition employed within the OC layer includes platinum (Pt), palladium (Pd), ruthenium (Ru), iridium (Ir), and rhodium (Rh), either by themselves, or in combinations thereof employing different loadings. In these embodiments, the PGM composition includes Pt/Rh with substantially similar loadings within a range from about 1 g/ft$^3$ to about 10 g/ft$^3$ supported onto a support oxide. In an example, the PGM composition employed within the OC layer includes PGM loadings of about 5 g/ft$^3$ Pt and about 5 g/ft$^3$ Rh supported onto a doped alumina support oxide powder.

SPGM CC Catalyst Configuration and Production

Figure 2:
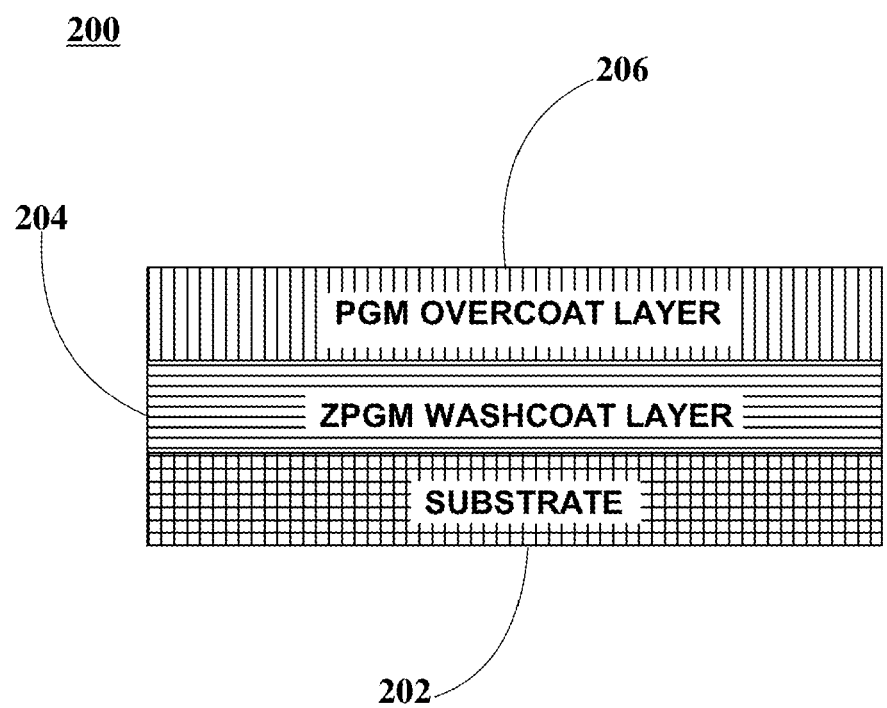
FIG. 2 is a graphical representation illustrating a catalyst configuration of a synergized-PGM (SPGM) catalyst for CC applications, according to an embodiment.

FIG. 2 is a graphical representation illustrating a catalyst configuration of a synergized-PGM (SPGM) catalyst for CC applications, according to an embodiment. In FIG. 2, catalyst configuration 200 includes substrate 202, ZPGM WC layer 204, and PGM OC layer 206. In some embodiments, ZPGM WC layer 204 is coated onto substrate 202. In these embodiments, PGM OC layer 206 is coated onto ZPGM WC layer 204.

In some embodiments, the ZPGM layer can be produced by employing any conventional catalyst synthesis methodologies. In these embodiments, the ZPGM layer is produced from powder comprising Ni—Fe spinel and doped $Al_2O_3$—$ZrO_2$. Further to these embodiments, the preparation of powdered Ni—Fe spinel and support oxide begins with the mixing of an appropriate amount of Ni nitrate solution and Fe nitrate solution at an appropriate molar ratio that results in $Ni_{0.5}Fe_{2.5}O_4$. Still further to these embodiments, the Ni—Fe nitrate solution is drop-wise added to the doped $Al_2O_3$—$ZrO_2$ (alumina-zirconia) support oxide powder via incipient wetness (IW) methodology. In these embodiments, the Ni—Fe/doped $Al_2O_3$—$ZrO_2$ support oxide powder is then dried at about 120° C. overnight and further calcined at a temperature within a range from about 600° C. to about 850° C. for about 5 hours. Further to these embodiments, the calcined material of Ni—Fe binary spinel and doped $Al_2O_3$—$ZrO_2$ is subsequently ground into fine grain powder, and further milled with water to produce a slurry. Still further to these embodiments, said slurry is coated onto the substrate and further dried and calcined at a temperature of about 650° C. from about 4 hours to about 5 hours to produce ZPGM WC layer 204.

In an example, a SPGM CC catalyst with ultra-low PGM loadings, incorporated within TWC systems 2 and 4, is produced including a ceramic substrate, such as, for example a 600/3.5 1.083 L substrate having a diameter (D) of 103.0 mm and a length (L) of 130.0 mm. Further to this example, the SPGM CC catalyst includes a ZPGM WC layer comprising a Ni—Fe binary spinel structure and doped $Al_2O_3$—$ZrO_2$ support oxide, as previously described above, and a PGM OC layer including Pt and Rh. In this example, the production of the PGM OC layer begins with the preparation of a mixed solution of Pt nitrate and Rh nitrate including PGM loadings of about 5 g/ft$^3$ Pt and about 5 g/ft$^3$ Rh. Further to this example, a mixture of doped alumina ($Al_2O_3$) and Ce-based oxygen storage material (OSM) at a ratio of about 1:1 by weight is milled separately and metallized with the Pt—Rh mixed nitrate solution to produce a slurry of PGM/(doped alumina +Ce-based OSM). Still further to this example, the slurry of PGM/(doped alumina+Ce-based OSM) is coated onto the ZPGM WC layer, and further dried and calcined at a temperature of about 550° C. for about 4 hours to produce the SPGM CC catalyst with ultra-low PGM loadings.

Multi-Mode Aging Cycle Procedure

In some embodiments and prior to emission testing according to FTP-75, aforementioned CC and UF catalysts within the TWC systems 1, 2, 3, and 4 are aged under a standard multi-mode aging cycle on an engine bench. In these embodiments, the CC (PGM-based and SPGM) catalysts are aged under the multi-mode aging condition at a bed temperature of about 1000° C. for about 50 hours. Further to these embodiments, the UF catalysts are aged under the multi-mode condition at a bed temperature of about 900° C. for about 50 hours.

Figure 3:
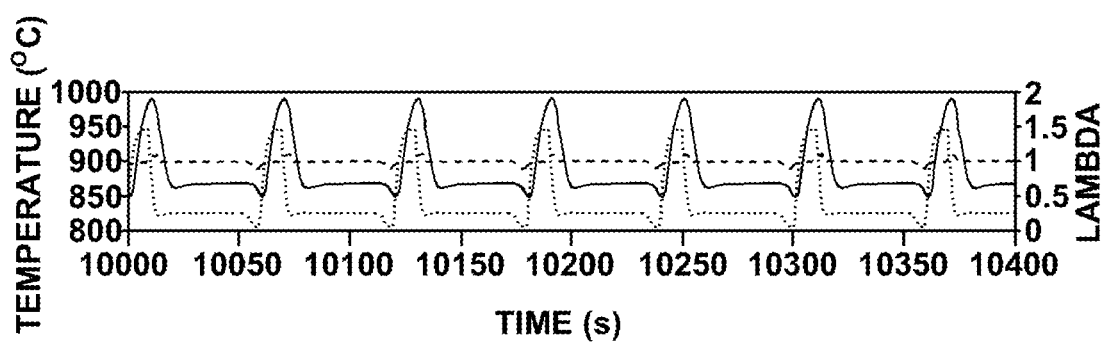
FIG. 3 is a graphical representation illustrating a standard multi-mode aging cycle protocol employed for engine bench aging of SPGM CC catalysts, according to an embodiment.

FIG. 3 is a graphical representation illustrating a standard multi-mode aging cycle protocol employed for engine bench aging of SPGM CC catalysts, according to an embodiment. In FIG. 3, multi-mode aging cycle 300 illustrates the aging procedure for the aforementioned SPGM CC catalysts.

In some embodiments, the multi-mode aging cycle procedure includes four segments. In these embodiments, aging segment 1 is performed employing an exhaust gas flow with a stoichiometric fuel-air ratio (AFR) and flowrate of about 80 SCFM (standard cubic feet per minute) per catalytic converter for a time duration of about 40 seconds. Further to these embodiments, aging segment 2 is performed employing an exhaust gas flow with a rich AFR and a flowrate of about 80 SCFM for a time duration of about 6 seconds. Still further to these embodiments, aging segment 3 is performed employing an exhaust gas flow with a rich AFR and further employing a secondary air injection flow for a time duration of about 10 seconds, thereby producing chemical reaction-induced thermal excursions (exotherms) having a brick temperature controlled at about 40 mm at a temperature of about 900° C. within ±20° C. In these embodiments, aging segment 4 is performed employing an exhaust gas flow with a stoichiometric AFR with further employing a secondary air injection flow for a time duration of about 4 seconds.

U.S. Federal Test Procedure (FTP-75)

Figure 4:
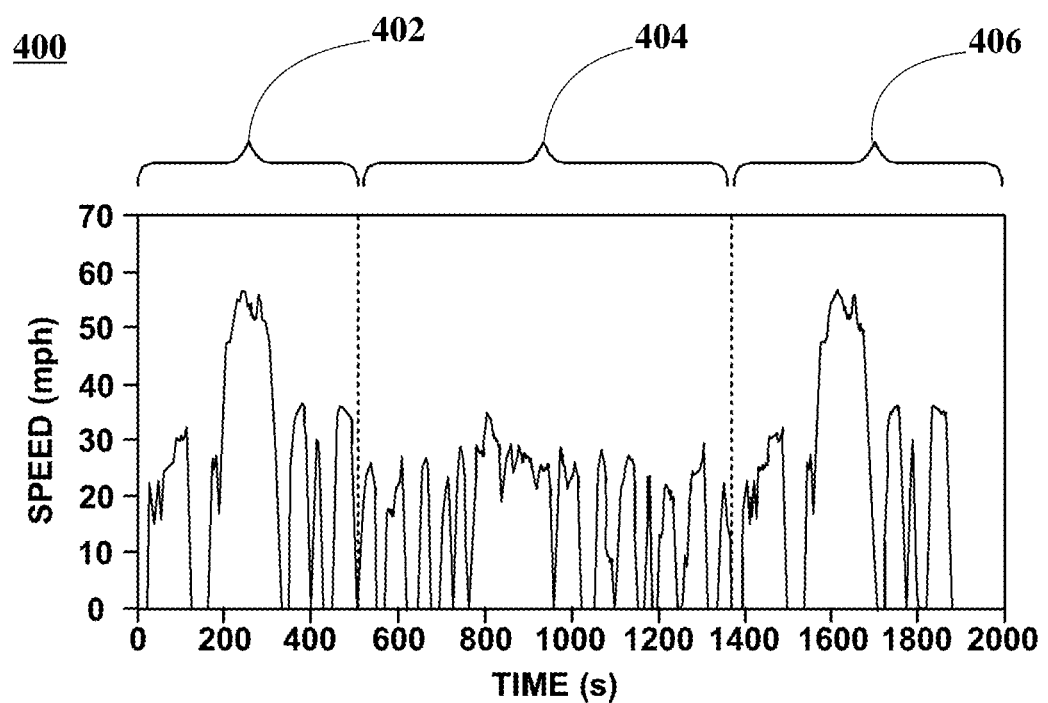
FIG. 4 is a graphical representation illustrating driving phases of the U.S. Federal Test Procedure (FTP-75) employed for testing, measuring, and diagnosing catalytic performance of TWC systems as described in FIGS. 1 and 2, according to an embodiment.

FIG. 4 is a graphical representation illustrating driving phases of the U.S Federal Test Procedure (FTP-75) employed for testing, measuring, and diagnosing catalytic performance of TWC systems as described in FIGS. 1 and 2, according to an embodiment. In FIG. 4, FTP-75 protocol 400 includes cold start phase 402, stabilized phase 404, and hot start phase 406.

In some embodiments, cold start phase 402 illustrates a phase of FTP-75 testing to measure tailpipe emissions and performance of the aforementioned TWC systems. In these embodiments, said driving phase is a cold start transient phase at ambient temperature of about 20° C. to about 30° C. performed for a time duration from zero to 505 seconds. Further to these embodiments, stabilized phase 404 illustrates a phase for driving conditions from about 506 seconds to about 1372 seconds performed after cold start phase 402. Still further to these embodiments and after stabilized phase 404 is finished, the engine is stopped for about 10 minutes and then hot start phase 406 begins. In these embodiments, hot start phase 406 illustrates two segments of driving conditions performed after stabilized phase 404 as follows: (1) a hot soak performed for a minimum time duration of about 540 seconds or a maximum time duration of about 660 seconds, and (2) a hot start transient phase performed for a time duration from zero to about 505 seconds. Further to these embodiments, tailpipe emissions from each phase are collected in a separate bag, analyzed, and expressed in g/mile.

Test Engines and Engine Specifications for Implementation of the FTP-75 Test

In some embodiments and referring to FIG. 1, engine 102 is implemented as a TGDI engine with an electronically controlled twin-scroll turbocharger, dual overhead camshaft (DOHC) engine with continuously variable valve timing in which direct injection is performed employing a cam-driven high pressure fuel pump. In these embodiments, the TGDI engine includes a two-stage variable displacement oil pump, an air-to-air intercooling system, and a cast aluminum engine block. Major specifications of the TGDI engine are illustrated in Table 1, below.

TABLE 1

| TGDI engine specifications. | | |
|---|---|---|
| SPECIFICATION | UNIT | VALUE |
| Displacement | cm$^3$ | 1,998.0 |
| Compression Ratio | | 9.5:1 |
| Max. Torque | lb-ft | 295.0 @ 3,000-4,000 rpm |
| Power | HP | 259.0 |

In other embodiments and referring to FIG. 1, engine 102 is implemented as a PI engine with a die-cast aluminum engine block having 16 valves with dual variable valve timing (VVT-i), low friction technologies including an offset crankshaft and a valve train with roller rockers, three-stage variable oil pump, reduced-tension piston rings and an auxiliary belt drive. In these embodiments, the PI engine includes an acoustic control induction system that switches the length of the intake tract between two stages, based on RPM and throttle angle, to ensure a strong torque across a broad engine speed range. Further to these embodiments, the PI engine includes new tumble control valves that enhance combustion while the engine is cold and help to bring catalytic converters up to working temperature quickly. Still further to these embodiments, the tumble control valves, along with new 12-hole high atomizing long-nozzle fuel injectors, reduce the amount of fuel adhering to the intake ports to maximize fuel economy and reduce harmful emissions. Major specifications of the PI engine are illustrated in Table 2, below.

TABLE 2

PI engine specifications.

| SPECIFICATION | UNIT | VALUE |
| --- | --- | --- |
| Displacement | cm$^3$ | 2,494.0 |
| Compression Ratio | | 10.4:1 |
| Max. Torque | lb-ft | 170.0 @ 4,100 rpm |
| Power | HP | 178.0 |

Tailpipe Weighted Emission Bag Results from FTP-75 Test—TGDI Engine

Figure 5:
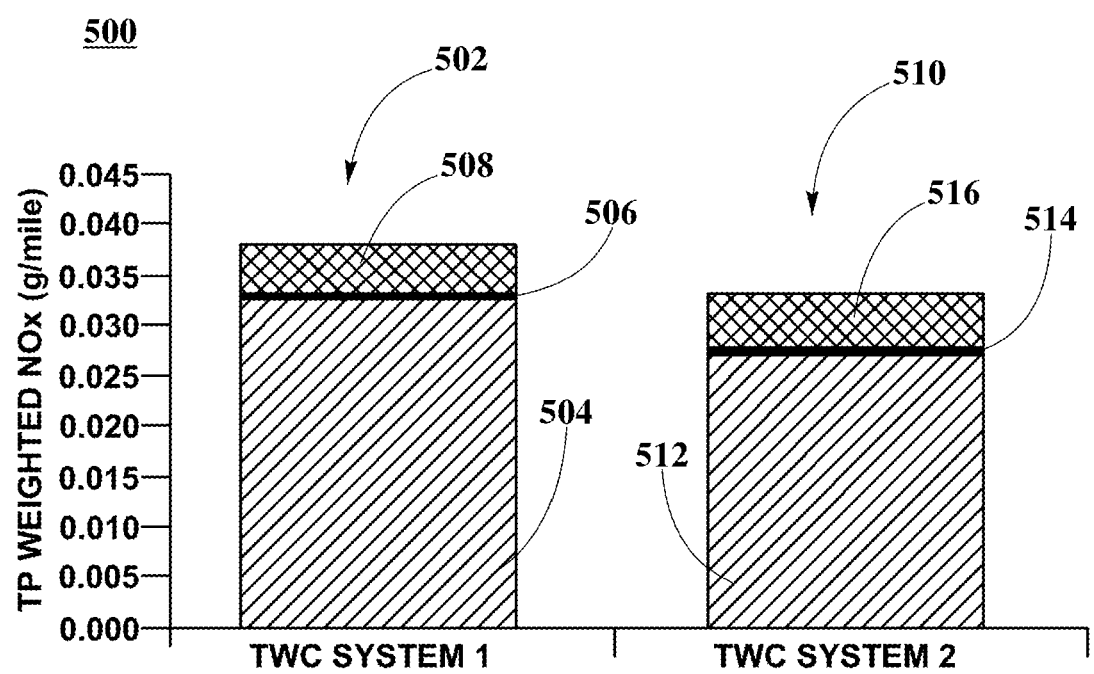
FIG. 5 is a graphical representation illustrating weighted $NO_X$ (g/mile) values at tailpipe for TWC systems 1 and 2 (as described above) employed within a turbo gasoline direct injection (TGDI) engine using FTP-75 test protocol as described in FIG. 4, according to an embodiment.

FIG. 5 is a graphical representation illustrating weighted $NO_X$ (g/mile) values at tailpipe for TWC systems 1 and 2 (as described above) employed within a turbo gasoline direct injection (TGDI) engine using FTP-75 test protocol as described in FIG. 4, according to an embodiment. In FIG. 5, TP weighted $NO_X$ emission 500 includes TWC system 1 TP weighted $NO_X$ 502 and TWC system 2 TP weighted $NO_X$ 510.

In some embodiments, TWC system 1 TP weighted NOx 502 includes three specific TP weighted $NO_X$ bars as follows: TP weighted NOx bar 504, TP weighted NOx bar 506, and TP weighted NOx bar 508. In these embodiments, each $NO_X$ bar illustrates the FTP-75 bag results in g/mile of weighted $NO_X$ for cold start phase 402, stabilized phase 404, and hot start phase 406, respectively, obtained when measuring tailpipe $NO_X$ emissions associated with TWC system 1. In other embodiments, TWC system 2 TP $NO_X$ weighted 510 includes three specific TP weighted $NO_X$ bars as follows: TP weighted $NO_X$ bar 512, TP weighted $NO_X$ bar 514, and TP weighted $NO_X$ bar 516. In these embodiments, each $NO_X$ bar illustrates the FTP-75 bag results in g/mile of weighted $NO_X$ for cold start phase 402, stabilized phase 404, and hot start phase 406, respectively, obtained when measuring tailpipe $NO_X$ emissions associated with TWC system 2.

In some embodiments, TP weighted $NO_X$ emissions collected in g/mile during implementation of FTP-75 testing associated with TWC systems 1 and 2 are detailed in Table 3, below. In these embodiments, TWC system 2 includes SPGM CC with ultra-low PGM loadings and OEM UF catalysts that exhibits lower tailpipe (TP) weighted $NO_X$ values as compared to TWC system 1 that includes OEM CC and UF catalysts. Further to these embodiments, TWC system 2 exhibits higher efficient TP $NO_X$ conversion than TWC system 1. Still further to these embodiments and at the end of cold start phase 402, TWC system 1 exhibits higher TP weighted $NO_X$ values than TWC system 2. In these embodiments, both aforementioned TWC systems exhibit substantially similar TP weighted $NO_X$ values for stabilized phase 404 and hot start phase 406. In summary, TWC system 2 exhibits a slightly improved performance in $NO_X$ reduction as compared with TWC system 1, thereby confirming that employing a SPGM CC with ultra-low PGM loadings is as effective as employing a high PGM commercialized CC catalyst.

TABLE 3

TP weighted $NO_x$ emission values associated with TWC systems 1 and 2, as illustrated in FIG. 5.

| FTP-75 PHASE | TWC SYSTEM | TP WEIGHTED $NO_x$ [g/mile] | ASSOCIATED ELEMENT |
| --- | --- | --- | --- |
| Cold start phase 402 | 1 | 0.033 | 504 |
| Stabilized phase 404 | 1 | 0.001 | 506 |
| Hot start phase 406 | 1 | 0.005 | 508 |
| Cold start phase 402 | 2 | 0.027 | 512 |
| Stabilized phase 404 | 2 | 0.001 | 514 |
| Hot start phase 406 | 2 | 0.006 | 516 |

Figure 6:
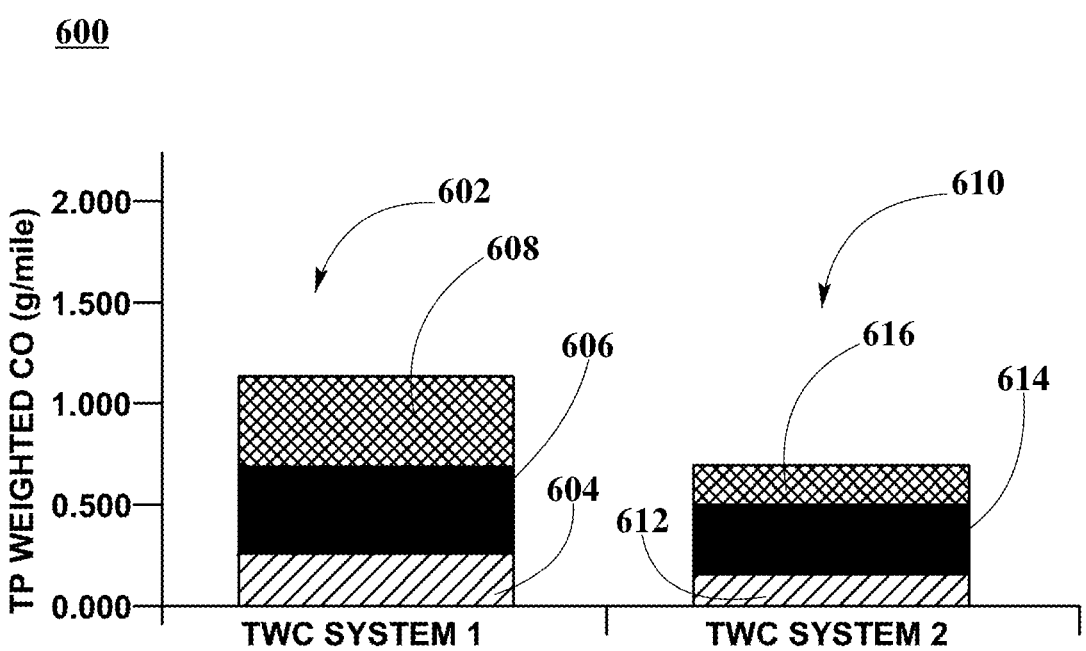
FIG. 6 is a graphical representation illustrating weighted CO (g/mile) values at tailpipe for TWC systems 1 and 2 (as described above) employed within a TGDI engine using FTP-75 test protocol as described in FIG. 4, according to an embodiment.

FIG. 6 is a graphical representation illustrating weighted CO (g/mile) values at tailpipe for TWC systems 1 and 2 (as described above) employed within a TGDI engine using FTP-75 test protocol as described in FIG. 4, according to an embodiment. In FIG. 6, TP weighted CO emission 600 includes TWC system 1 TP weighted CO 602 and TWC system 2 TP weighted CO 610.

In some embodiments, TWC system 1 TP weighted CO 602 includes three specific weighted CO bars as follows: TP weighted CO bar 604, TP weighted CO bar 606, and TP weighted CO bar 608. In these embodiments, each CO bar illustrates the FTP-75 bag results in g/mile of weighted CO for cold start phase 402, stabilized phase 404, and hot start phase 406, respectively, obtained when measuring tailpipe CO emissions associated with TWC system 1. In other embodiments, TWC system 2 TP weighted CO 610 includes three specific weighed CO bars as follows: TP weighted CO bar 612, TP weighted CO bar 614, and TP weighted CO bar 616. In these embodiments, each CO bar illustrates the FTP-75 bag results in g/mile of weighted CO for cold start phase 402, stabilized phase 404, and hot start phase 406, respectively, obtained when measuring tailpipe CO emissions associated with TWC system 2.

In some embodiments, TP weighted CO emissions collected in g/mile during implementation of FTP-75 testing associated with TWC systems 1 and 2 are detailed in Table 4, below. In these embodiments, TWC system 2 includes an SPGM CC catalyst with ultra-low PGM loadings that exhibits overall significant CO conversion as compared to TWC system 1 that includes OEM CC and UF catalysts. Further to these embodiments, TWC system 2 exhibits higher efficient CO conversion than TWC system 1. Still further to these embodiments, TP weighted CO values for TWC system 2 is significantly lower than TP weighted CO values for TWC system 1 for cold start phase 402, stabilized phase 404, and hot start phase 406. These results confirm that employing an SPGM CC catalyst with about 10 g/ft$^3$ PGM loading is as efficient as employing a high PGM OEM CC catalyst with about 106 g/ft$^3$ PGM loading for CO conversion.

TABLE 4

TP weighted CO emission values associated with TWC systems 1 and 2, as illustrated in FIG. 6.

| FTP-75 PHASE | TWC SYSTEM | TP WEIGHTED CO [g/mile] | ASSOCIATED ELEMENT |
| --- | --- | --- | --- |
| Cold start phase 402 | 1 | 0.270 | 604 |
| Stabilized phase 404 | 1 | 0.441 | 606 |

TABLE 4-continued

TP weighted CO emission values associated with
TWC systems 1 and 2, as illustrated in FIG. 6.

| FTP-75 PHASE | TWC SYSTEM | TP WEIGHTED CO [g/mile] | ASSOCIATED ELEMENT |
|---|---|---|---|
| Hot start phase 406 | 1 | 0.458 | 608 |
| Cold start phase 402 | 2 | 0.197 | 612 |
| Stabilized phase 404 | 2 | 0.297 | 614 |
| Hot start phase 406 | 2 | 0.200 | 616 |

Figure 7:
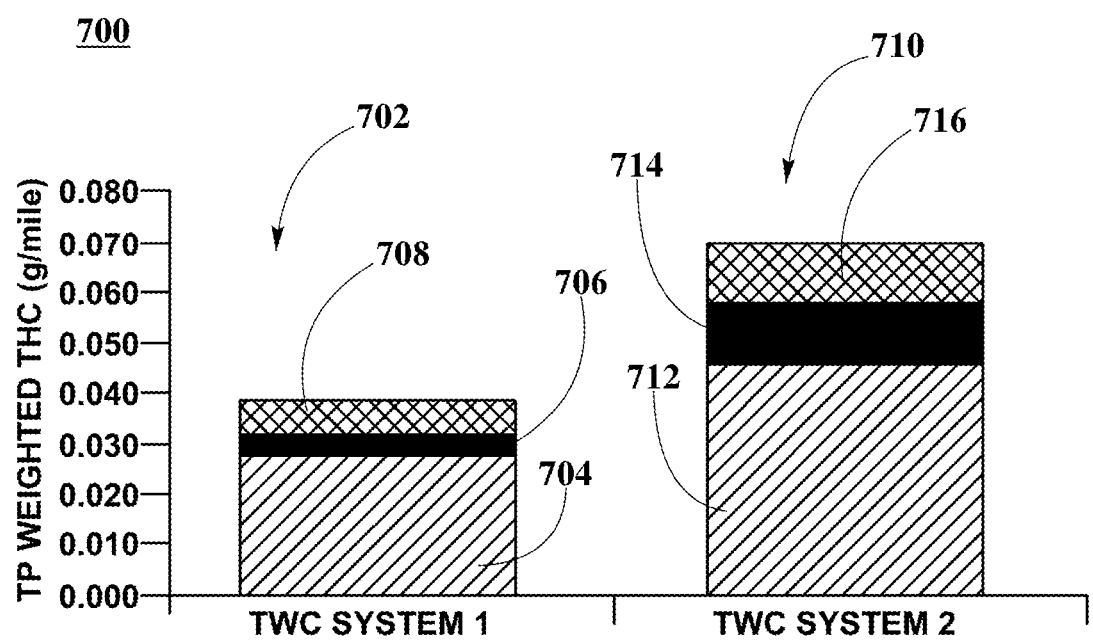
FIG. 7 is a graphical representation illustrating weighted THC (g/mile) values at tailpipe for TWC systems 1 and 2 (as described above) employed within a TGDI engine using FTP-75 test protocol as described in FIG. 4, according to an embodiment.

FIG. 7 is a graphical representation illustrating weighted THC (g/mile) values at tailpipe for TWC systems 1 and 2 (as described above) employed within a TGDI engine using FTP-75 test protocol as described in FIG. 4, according to an embodiment. In FIG. 7, TP weighted THC emission 700 includes TWC system 1 TP weighted THC 702 and TWC system 2 TP weighted THC 710.

In some embodiments, TWC system 1 TP weighted THC 702 includes three specific TP weighted THC bars as follows: TP weighted THC bar 704, TP weighted THC bar 706, and TP weighed THC bar 708. In these embodiments, each THC bar illustrates the FTP-75 bag results in g/mile of weighted THC for cold start phase 402, stabilized phase 404, and hot start phase 406, respectively, obtained when measuring tailpipe THC emissions associated with TWC system 1. In other embodiments, TWC system 2 TP weighted THC 710 includes three specific TP weighted THC bars as follows: TP weighted THC bar 712, TP weighted THC bar 714, and TP weighted THC bar 716. In these embodiments, each THC bar illustrates the FTP-75 bag results in g/mile of weighted THC for cold start phase 402, stabilized phase 404, and hot start phase 406, respectively, obtained when measuring tailpipe THC emissions associated with TWC system 2.

In some embodiments, TP weighted THC emissions collected in g/mile during implementation of FTP-75 testing associated with TWC systems 1 and 2 are detailed in Table 5, below. In these embodiments, TWC system 2 includes an SPGM CC catalyst with ultra-low PGM loadings that exhibits higher TP weighted THC values as compared to TWC system 1 that includes OEM CC and UF catalysts. Further to these embodiments, TWC system 2 exhibits lower performance in THC conversion than TWC system 1.

TABLE 5

TP weighted THC emission values associated with
TWC systems 1 and 2, as illustrated in FIG. 7.

| FTP-75 PHASE | TWC SYSTEM | TP WEIGHTED THC [g/mile] | ASSOCIATED ELEMENT |
|---|---|---|---|
| Cold start phase 402 | 1 | 0.028 | 704 |
| Stabilized phase 404 | 1 | 0.005 | 706 |
| Hot start phase 406 | 1 | 0.005 | 708 |
| Cold start phase 402 | 2 | 0.045 | 712 |
| Stabilized phase 404 | 1 | 0.012 | 714 |
| Hot start phase 406 | 2 | 0.012 | 716 |

Figure 8:
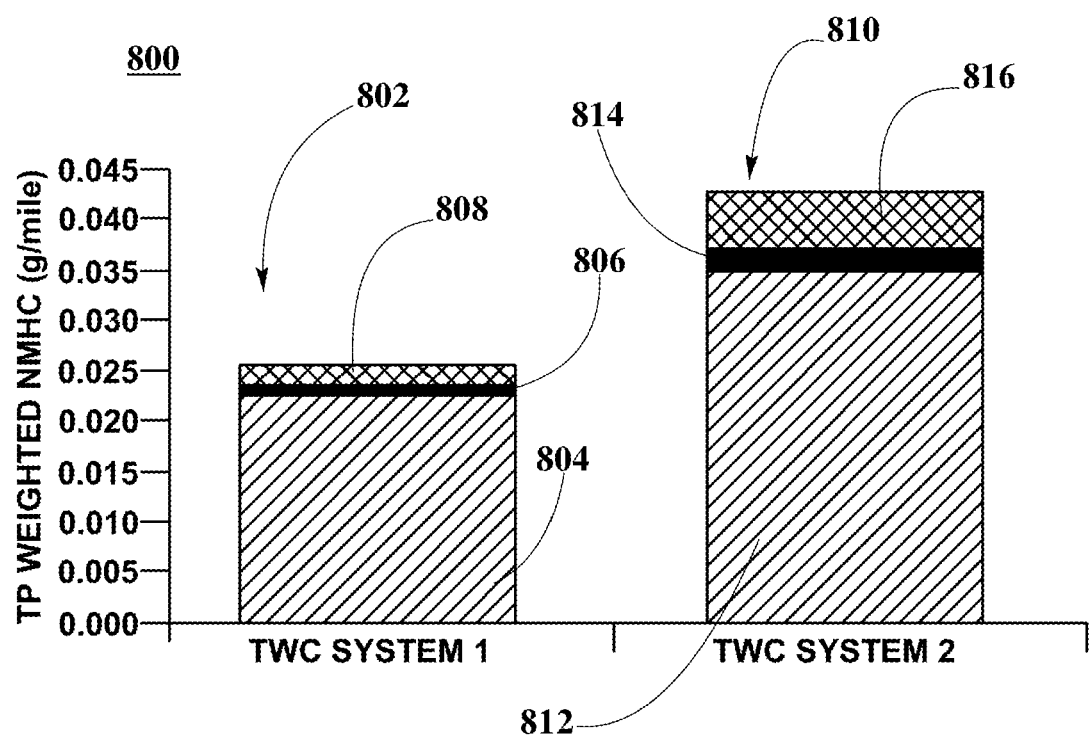
FIG. 8 is a graphical representation illustrating weighted non-methane hydrocarbons (NMHC) (g/mile) values at tailpipe for TWC systems 1 and 2 (as described above) employed within a TGDI engine using FTP-75 test protocol as described in FIG. 4, according to an embodiment.

FIG. 8 is a graphical representation illustrating weighted non-methane hydrocarbons (NMHC) (g/mile) values at tailpipe for TWC systems 1 and 2 (as described above) employed within a TGDI engine using FTP-75 test protocol as described in FIG. 4, according to an embodiment. In FIG. 8, TP weighted NMHC emission 800 includes TWC system 1 TP weighted NMHC 802 and TWC system 2 TP weighted NMHC 810.

In some embodiments, TWC system 1 TP weighted NMHC 802 includes three specific TP weighted NMHC bars as follows: TP weighted NMHC bar 804, TP weighted NMHC bar 806, and TP weighted NMHC bar 808. In these embodiments, each NMHC bar illustrates the FTP-75 bag results in g/mile of weighted NMHC for cold start phase 402, stabilized phase 404, and hot start phase 406, respectively, obtained when measuring tailpipe NMHC emissions associated with TWC system 1. In other embodiments, TWC system 2 TP weighted NMHC 810 includes three specific NMHC TP weighted bars as follows: TP weighted NMHC bar 812, TP weighted NMHC bar 814, and TP weighted NMHC bar 816. In these embodiments, each NMHC bar illustrates the FTP-75 bag results in g/mile of weighted NMHC for cold start phase 402, stabilized phase 404, and hot start phase 406, respectively, obtained when measuring tailpipe NMHC emissions associated with TWC system 2.

In some embodiments, TP weighted NMHC emissions collected in g/mile during implementation of FTP-75 testing associated with TWC systems 1 and 2 are detailed in Table 6, below. In these embodiments, TWC system 2 includes an SPGM CC catalyst with ultra-low PGM loadings that exhibits slightly higher TP weighted NMHC values as compared to TWC system 1 that includes OEM CC and UF catalysts. In summary, the catalytic behavior exhibited by TWC system 2 during each one of the FTP-75 phases is comparable to the catalytic behavior of the high PGM based OEM catalyst.

TABLE 6

TP weighted NMHC emission values associated with
TWC systems 1 and 2, as illustrated in FIG. 7.

| FTP-75 PHASE | TWC SYSTEM | TP WEIGHTED NMHC [g/mile] | ASSOCIATED ELEMENT |
|---|---|---|---|
| Cold start phase 402 | 1 | 0.022 | 804 |
| Stabilized phase 404 | 1 | 0.002 | 806 |
| Hot start phase 406 | 1 | 0.002 | 808 |
| Cold start phase 402 | 2 | 0.035 | 812 |
| Stabilized phase 404 | 2 | 0.003 | 814 |
| Hot start phase 406 | 2 | 0.005 | 816 |

Figure 9:
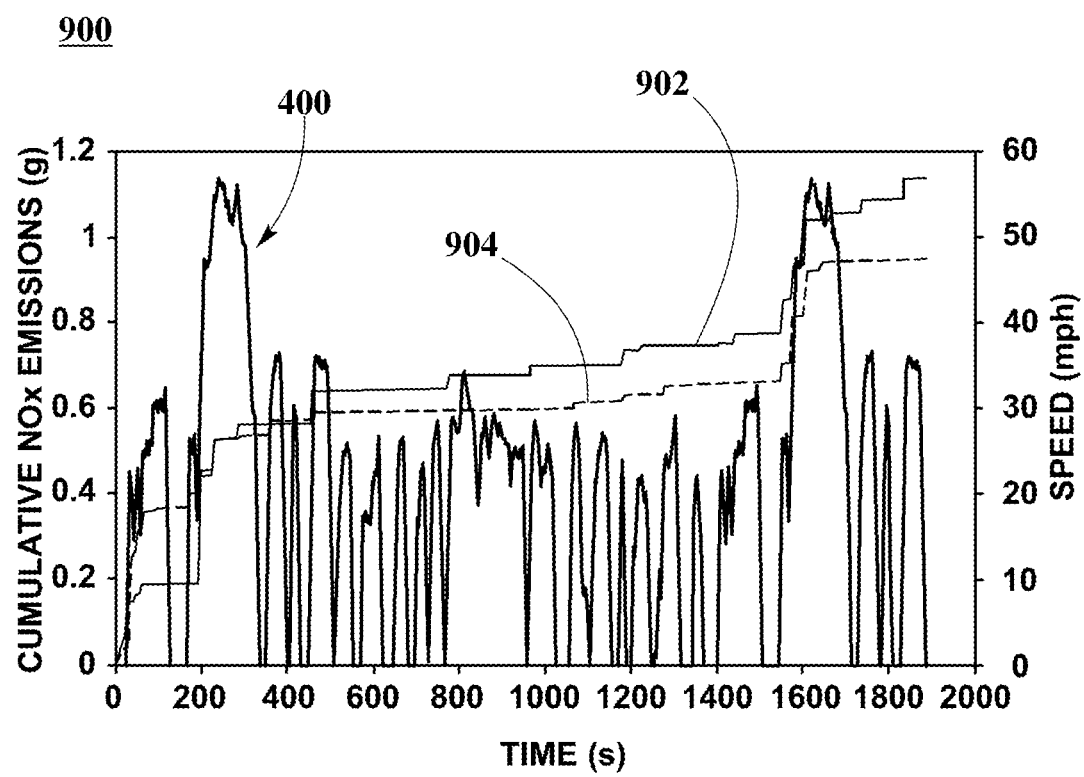
FIG. 9 is a graphical representation illustrating cumulative mid-tailpipe $NO_X$ emission results for TWC systems 1 and 2 (as described above), and employing a TGDI engine at given speeds, according to an embodiment.

FIG. 9 is a graphical representation illustrating cumulative mid-tailpipe $NO_X$ emission results for TWC systems 1 and 2 (as described above), and employing a TGDI engine at given speeds, according to an embodiment. In FIG. 9, cumulative $NO_X$ values comparison 900 includes cumulative $NO_X$ curve 902, cumulative $NO_X$ curve 904, and FTP-75 protocol 400. In FIG. 9, elements having substantially similar element numbers from previous figures function in a substantially similar manner.

In some embodiments, cumulative $NO_X$ curve 902 illustrates cumulative $NO_X$ emission results obtained at mid-tailpipe (MID) associated with TWC system 1 at given speeds. In these embodiments, cumulative $NO_X$ curve 904 illustrates cumulative $NO_X$ emission results obtained at MID associated with TWC system 2 at given speeds.

In some embodiments, the results are obtained during the implementation of Federal Test Procedure (FTP-75) protocol, FTP-75 protocol 400 as described in FIG. 4, for TWC systems 1 and 2. In these embodiments, the results for each of the TWC systems are compared to assess improvements in conversion efficiency and performance of the TWC system including SPGM CC catalyst. Further to these embodiments, the synergistic effects of the aforementioned SPGM CC catalyst on $NO_X$ are verified. In these embodiments, verification of the synergistic effects are conducted by comparing the cumulative grams of $NO_X$, for the TWC systems 1 and 2, measured downstream at the mid-tailpipe section of the engine exhaust system including the TGDI engine, as previously described, above at given speeds.

In some embodiments, cumulative MID $NO_X$ values (cumulative $NO_X$ curve 904) associated with TWC system 2 are substantially lower than cumulative MID $NO_X$ values (cumulative $NO_X$ curve 902) associated with TWC system 1. In these embodiments, the improvement in NOx mid-tailpipe emission (cumulative $NO_X$ curve 904) indicates SPGM CC catalyst exhibits greater functionality when compared to an OEM PGM CC catalyst. Further to these embodiments, the spinel oxide ZPGM layer within the SPGM CC catalyst increased functionality to the PGM layer, thereby lowering NOx mid-tailpipe emission values associated with TWC system 2. In summary, the TWC system 2 exhibits higher $NO_X$ conversion efficiency than TWC system 1.

Figure 10:
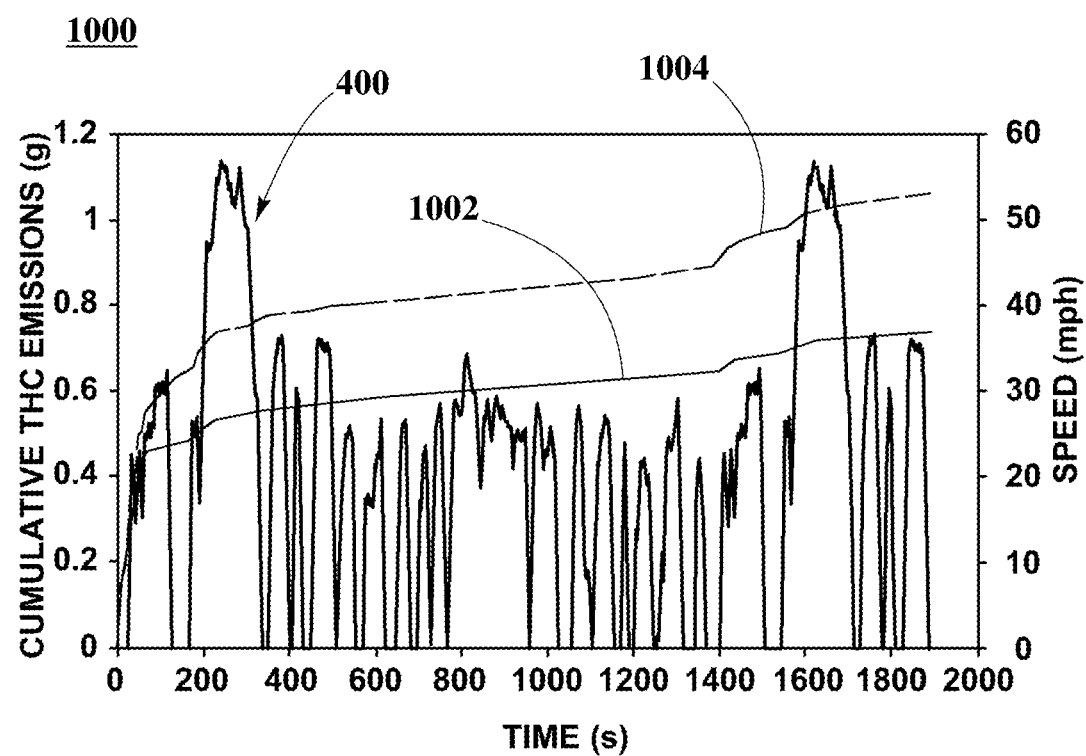
FIG. 10 is a graphical representation illustrating cumulative mid-tailpipe THC emission results for TWC systems 1 and 2 (as described above), and employing a TGDI engine at given speeds, according to an embodiment.

FIG. 10 is a graphical representation illustrating cumulative mid-tailpipe THC emission results for TWC systems 1 and 2 (as described above), and employing a TGDI engine at given speeds, according to an embodiment. In FIG. 10, cumulative THC values comparison 1000 includes cumulative THC curve 1002, cumulative THC curve 1004, and FTP-75 protocol 400. In FIG. 10, elements having substantially similar element numbers from previous figures function in a substantially similar manner.

In some embodiments, cumulative THC curve 1002 illustrates cumulative THC emission results obtained at mid-tailpipe (MID) associated with TWC system 1. In these embodiments, cumulative THC curve 1004 illustrates cumulative THC emission results obtained at MID associated with TWC system 2.

In some embodiments, the results are obtained during the implementation of Federal Test Procedure (FTP-75) protocol, FTP-75 protocol 400 as described in FIG. 4, for TWC systems 1 and 2. In these embodiments, the results for each of the TWC systems are compared to assess improvements in conversion efficiency and performance of the TWC system including ultra-low loading SPGM CC catalyst. Further to these embodiments, the synergistic effects of the aforementioned SPGM CC catalyst on THC are verified. In these embodiments, verification of the synergistic effects are conducted by comparing the cumulative grams of THC, for the TWC systems 1 and 2, measured downstream at the mid-tailpipe section of the engine exhaust system including the TGDI engine, as previously described above, at given speeds.

In some embodiments, cumulative MID $NO_X$ values (cumulative $NO_X$ curve 1004) associated with TWC system 2 are slightly higher than cumulative MID $NO_X$ values (cumulative $NO_X$ curve 902) associated with TWC system 1. In summary, the TWC system 2 exhibits slightly lower THC conversion efficiency that TWC system 1.

Tailpipe Weighted Emission Bag Results from FTP-75 Test—PI Engine

Figure 11:
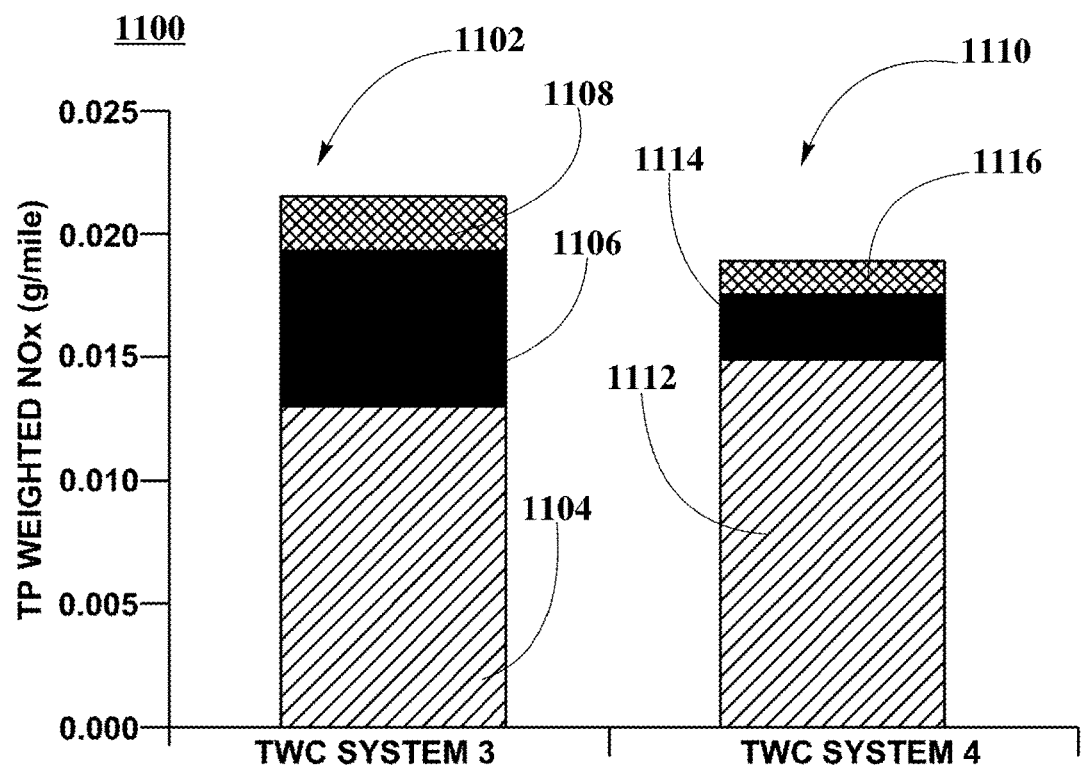
FIG. 11 is a graphical representation illustrating weighted $NO_X$ (g/mile) values at tailpipe for TWC systems 3 and 4 (as described above) employed within a naturally aspirated port injection (PI) engine using FTP-75 test protocol as described in FIG. 4, according to an embodiment.

FIG. 11 is a graphical representation illustrating weighted $NO_X$ (g/mile) values at tailpipe for TWC systems 3 and 4 (as described above) employed within a naturally aspirated port injection (PI) engine using FTP-75 test protocol as described in FIG. 4, according to an embodiment. In FIG. 11, TP weighted $NO_X$ emission 1100 includes TWC system 3 TP weighted $NO_X$ 1102 and TWC system 4 TP weighted $NO_X$ 1110.

In some embodiments, TWC system 3 TP weighted $NO_X$ 1102 includes three specific TP weighted $NO_X$ bars as follows: TP weighted NOx bar 1104, TP weighted NOx bar 1106, and TP weighted $NO_X$ bar 1108. In these embodiments, each $NO_X$ bar illustrates the FTP-75 bag results in g/mile of weighted $NO_X$ for cold start phase 402, stabilized phase 404, and hot start phase 406, respectively, obtained when measuring tailpipe $NO_X$ weighted emissions associated with TWC system 3. In other embodiments, TW system 4 TP weighted $NO_X$ 1110 includes three specific TP weighted $NO_X$ bars as follows: TP weighted $NO_X$ bar 1112, TP weighted $NO_X$ bar 1114, and TP weighted $NO_X$ bar 1116. In these embodiments, each $NO_X$ bar illustrates the FTP-75 bag results in g/mile of weighted $NO_X$ for cold start phase 402, stabilized phase 404, and hot start phase 406, respectively, obtained when measuring tailpipe $NO_X$ emissions associated with TWC system 4.

In some embodiments, TP weighted $NO_X$ emissions collected in g/mile during implementation of FTP-75 testing associated with TWC systems 3 and 4 are detailed in Table 7, below. In these embodiments, TWC system 4 includes SPGM CC and PGM-based UF catalysts that exhibits higher $NO_X$ conversion as compared to TWC system 3 that includes OEM CC and UF catalysts. Further to these embodiments and at the end of cold start phase 402, TWC system 4 exhibits slightly higher TP weighted $NO_X$ values than TWC system 3. Still further to these embodiments and after stabilized phase 404 and hot start phase 406, TWC system 4 exhibits lower TP weighted $NO_X$ values than TWC system 3. These results confirm that employing an SPGM CC catalyst incorporating Ni—Fe binary spinel to low loading PGM total 10 g/ft$^3$ is effective CC catalyst. In summary, TWC system 4 exhibits improved performance in $NO_X$ reduction when compared with TWC system 3.

TABLE 7

TP weighted $NO_x$ emission values associated with TWC systems 3 and 4, as illustrated in FIG. 11.

| FTP-75 PHASE | TWC SYSTEM | TP WEIGHTED $NO_x$ [g/mile] | ASSOCIATED ELEMENT |
|---|---|---|---|
| Cold start phase 402 | 3 | 0.013 | 1104 |
| Stabilized phase 404 | 3 | 0.006 | 1106 |
| Hot start phase 406 | 3 | 0.002 | 1108 |
| Cold start phase 402 | 4 | 0.015 | 1112 |
| Stabilized phase 404 | 4 | 0.003 | 1114 |
| Hot start phase 406 | 4 | 0.001 | 1116 |

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A catalytic system for treating an exhaust stream of a combustion engine, comprising:
    a close-coupled catalytic converter configured to accept at least one exhaust gas stream from said combustion engine, the close-coupled catalytic converter comprising a synergized platinum group metal catalyst comprising a spinel catalytic composition, wherein the synergized platinum group metal catalyst has a platinum group metal concentration of 1 g/ft$^3$ to 10 g/ft$^3$;
    an underfloor catalytic converter downstream of, and, in fluid communication with said close-coupled catalytic converter, the underfloor catalytic converter comprising a platinum group metal catalyst; and
    wherein the spinel catalyst composition comprises a binary spinel having a general formula $A_xB_{3-x}O_4$ wherein X is from 0.01 to 2.99, and A and B are selected from the group consisting of sodium, potassium, calcium, barium, zinc, cadmium, aluminum, magnesium, manganese, nickel, copper, cobalt, iron, chromium, titanium, cerium, strontium, lanthanum, praseodymium, neodymium, samarium, indium, and mixtures thereof.

2. The catalytic system of claim 1, wherein the binary spinel comprises a Ni—Fe spinel.

3. The catalytic system of claim 2, wherein the Ni—Fe spinel comprises $Ni_{0.5}Fe_{2.5}O_4$.

4. A catalytic system for treating an exhaust stream of a combustion engine, comprising:

a close-coupled catalytic converter configured to accept at least one exhaust gas stream from said combustion engine, the close-coupled catalytic converter comprising a synergized platinum group metal catalyst comprising a spinel catalytic composition, wherein the synergized platinum group metal catalyst has a platinum group metal concentration of 1 $g/ft^3$ to 10 $g/ft^3$;

an underfloor catalytic converter downstream of, and, in fluid communication with said close-coupled catalytic converter, the underfloor catalytic converter comprising a platinum group metal catalyst;

wherein the spinel catalyst composition comprises at least one substrate, and a catalyst composition comprising a spinel oxide having a formula $A_xB_yM_{3-X-Y}$ where X is from about 0.01 to about 1.99 and Y is from about 0.01 to about 1.0; and wherein A, B, and M are different from each other, and are selected from the group consisting of sodium, potassium, calcium, barium, zinc, cadmium, aluminum, magnesium, manganese, nickel, copper, cobalt, iron, chromium, titanium, cerium, strontium, lanthanum, praseodymium, neodymium, samarium, indium, and mixtures thereof.

* * * * *